R. R. & J. Craig,
Nozzle.
No. 98,234.  Patented Dec. 28, 1869.
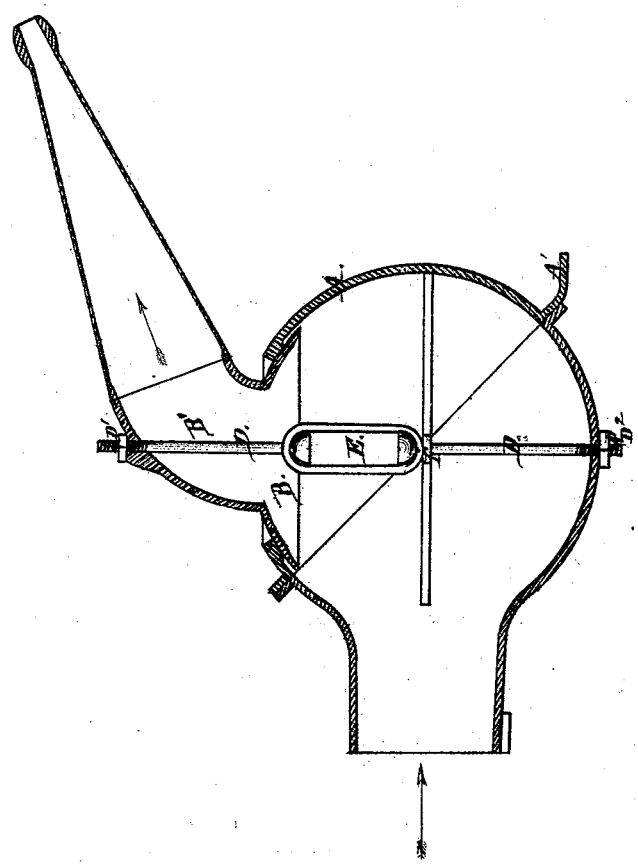
Witnesses
H. Monteverde
John Corse
Inventor
R. R. & J. Craig
By their Atty C. W. M. Smith

United States Patent Office.

RANDOLPH RABY CRAIG AND JOSEPH CRAIG, OF NEVADA, CALIFORNIA.

Letters Patent No. 98,234, dated December 28, 1869.

IMPROVEMENT IN BALL-AND-SOCKET JOINTS.

The Schedule referred to in these Letters Patent and making part of the same.

*To all whom it may concern:*

Be it known that we, RANDOLPH RABY CRAIG and JOSEPH CRAIG, of Nevada City, in the county of Nevada, and State of California, have invented certain new and useful Improvements in Machines for Hydraulic Mining; and we do hereby declare that the following is a full and exact description of the same, reference being had to the accompanying drawings, and to the letters of reference marked thereon.

The nature of our invention is to provide an improved attachment to the ball-and-socket joint used in hydraulic mining, so that the upper part of the ball or sphere, which carries the eduction-pipe or nozzle, will move easily in the socket in every direction, without producing any considerable amount of friction, which is now so largely incident to the use of the common ball-and-socket joint, as to render it almost impracticable, especially in hydraulic mining, where the pressure of the water must necessarily be great, in order to produce the desired effect upon the gravel or cement bank to be washed.

In order to utilize the ball-and-socket joint so that it can be employed with ease and economy under a great pressure of water, and admit of the nozzle being turned at almost every point, from a horizontal to a vertical or perpendicular, we employ double rods, which are provided with set-screws, and are connected centrally to form swivel-joints.

The upper rod extends through the ball, and the lower rod through the socket, and by the turning of the set-screws, the socket is drawn nearer to or more remote from the interior surface of the ball, which lessens the friction in a greater or lesser degree, as, when it is entirely removed from the surface of the ball, the socket turns simply on a pivot or swivel.

A stay-plate is used to keep the swivel in the centre of the ball, so that the friction will be equal when the socket is turned in any direction.

To more fully describe our invention, we refer to the accompanying drawing, and letters marked thereon, which represents a sectional elevation.

For an easy adjustment of the socket, the ball A is divided horizontally, and is cast of iron or other metal, with flanges pierced for bolts for holding it together.

The upper flange extends back, to form an apron, A', for a rigid attachment to a table or supporting-post.

The socket B is also cast of iron, or other metal, and has a gooseneck-extension, B', with the desired curvature to attach the eduction-pipe or nozzle.

To regulate the pressure of the socket B against the bevelled edge of the ball, and overcome the great amount of friction produced by the great force of water, we employ rods D D, connected centrally by a swivel, E, which forms a swivel-joint.

The uppper rod extends through the opening of the socket, and the exit-pipe or gooseneck, and is provided with a set-screw, $D^1$.

The lower rod passes through the base of the ball, and is also provided with a set-screw, $D^2$, and when in position, both the rods are perpendicular, and the heads of which may turn in the swivel with the socket.

By the adjustment of the set-screws, the socket is depressed or brought nearer to the bevelled edge of the ball, and consequently more or less friction is produced, according to the degree of the pressure of the water upon the ball, and if the surface of the ball were allowed to come in close contact with the socket, it would be almost impossible, single-handed, to move the nozzle under a three-hundred foot pressure; but by this improvement and application of ours, to the ball-and-socket joint, it is made possible and easy for a child to turn the ball and nozzle, even under a greater pressure. Also, the circumference of the ball is very much reduced, and a less surface for friction is had, if it is liable at all to be produced.

To keep the swivel and rods vertical, and prevent unequal friction, we employ a stay-plate, F, with radial arms resting against the ball.

The lower rod passes through the centre of this stay-plate, which has an opening sufficient to admit of considerable play, and the lower end of the swivel may rest upon it.

Friction-rollers might be placed between the ball and socket, and the use of these, we think, was made mention of in a former specification for an improved hydraulic nozzle, our claims to which were rejected, but upon trial it was found to be difficult to keep the rollers and ball in place without grooves or other devices, which rendered the apparatus complicated, without reducing the friction to that extent which is now accomplished by our present improvements.

Having thus described our invention,

What we claim, and desire to secure by Letters Patent, is—

The combination of the ball-and-socket joint, consisting substantially of the parts A and B, with the rods D, set-screws $D^1$ $D^2$, swivel E, and stay-plate F, substantially as and for the purpose described.

In witness whereof, we have hereunto set our hands and seals.

RANDOLPH RABY CRAIG. [L. S.]
JOSEPH CRAIG. [L. S.]

Witnesses:
L. W. WILLIAMS,
C. T. CANFIELD.